US007633861B2

(12) United States Patent
Willhite et al.

(10) Patent No.: US 7,633,861 B2
(45) Date of Patent: Dec. 15, 2009

(54) FABRIC ACCESS INTEGRATED CIRCUIT CONFIGURED TO BOUND CELL REORDER DEPTH

(75) Inventors: Nelson Willhite, Sunnyvale, CA (US); Mike Noll, San Jose, CA (US); Robert Steven Martin, Los Gatos, CA (US); Akhil Duggal, Los Altos, CA (US); Craig Lindberg, Nevada City, CA (US); Thomas Carleton Jones, San Jose, CA (US); Srinivas Komidi, San Jose, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 661 days.

(21) Appl. No.: 10/831,699

(22) Filed: Apr. 23, 2004

(65) Prior Publication Data

US 2004/0213151 A1    Oct. 28, 2004

Related U.S. Application Data

(60) Provisional application No. 60/465,654, filed on Apr. 25, 2003.

(51) Int. Cl.
*G01R 31/08* (2006.01)
*G06F 11/00* (2006.01)
*G08C 15/00* (2006.01)

(52) U.S. Cl. .................................... 370/229

(58) Field of Classification Search ................. 370/229, 370/217, 218, 230, 231, 232, 235, 237, 242, 370/244, 248, 249, 250, 328, 329, 352, 395.21, 370/395.42, 395.71, 438, 439, 443, 444
See application file for complete search history.

(56) References Cited

U.S. PATENT DOCUMENTS

| 5,862,128 | A * | 1/1999 | Cooperman et al. | 370/236 |
|---|---|---|---|---|
| 6,052,376 | A * | 4/2000 | Wills | 370/419 |
| 6,201,792 | B1 * | 3/2001 | Lahat | 370/236 |
| 6,490,248 | B1 * | 12/2002 | Shimojo | 370/229 |
| 6,747,971 | B1 * | 6/2004 | Hughes et al. | 370/387 |
| 6,856,595 | B1 * | 2/2005 | Brown | 370/229 |
| 6,856,622 | B1 * | 2/2005 | Calamvokis et al. | 370/390 |
| 7,027,457 | B1 * | 4/2006 | Chiussi et al. | 370/414 |
| 2002/0091913 | A1 * | 7/2002 | Fukagawa | 712/218 |
| 2003/0002517 | A1 * | 1/2003 | Takajitsuko et al. | 370/428 |
| 2003/0152094 | A1 * | 8/2003 | Colavito et al. | 370/412 |

OTHER PUBLICATIONS

Daniel P. Bovet and Gerald Estrin, On Static Memory Allocation in Computer Systems, Jun. 1970, IEEE, vol. C-19 No. 6, p. 493.*

* cited by examiner

*Primary Examiner*—Chirag G Shah
*Assistant Examiner*—Ashley L Shivers
(74) *Attorney, Agent, or Firm*—Van Pelt, Yi & James, LLP

(57) ABSTRACT

Bounding cell reorder depth is disclosed. It is determined whether a reorder buffer that is associated with a switch fabric exceeds a depth limit. In the event that the reorder buffer exceeds the depth limit, backpressure with respect to a source associated with the reorder buffer is sent. In such cases source based back pressure information is included in a reserved field in a cell that is being sent into the switch fabric. In the event that the reorder buffer does not exceed the depth limit, the cell is sent to the switch fabric. In such cases the reserved field is present in the cell but is unused.

17 Claims, 5 Drawing Sheets

FABRIC ACCESS INTEGRATED CIRCUIT CONFIGURED TO BOUND CELL REORDER DEPTH

CROSS REFERENCE TO RELATED APPLICATIONS

This application claims priority to U.S. Provisional Patent Application No. 60/465,654 entitled NETWORK SWITCH FABRIC ACCESS INTEGRATED CIRCUIT filed Apr. 25, 2003, which is incorporated herein by reference for all purposes.

FIELD OF THE INVENTION

The present invention relates generally to data networking. More specifically, bounding cell reorder buffer depth is disclosed.

BACKGROUND OF THE INVENTION

In data communication networks, devices such as routers or switches are often used to transfer data from a source to a destination. In some existing systems, a switch fabric is used to transfer data from a source to a destination. The switch fabric may include multiple switch planes that operate independently. For example, in non-striped architectures where whole cells are switched by the switch fabric, the switch planes within the switch fabric may operate without synchronizing with each other. Although independent switch planes have certain performance advantages, they often lead to problems when cells arrive out of sequence and need to be reordered. Systems with independent switch planes typically require some buffering at each destination so that cells arriving out of sequence can be arranged to preserve their original order. As a result, if one switch plane fails or experiences heavy load, the delay in the arrival of certain cells may cause the buffers to over flow. For example, a stream of cells (numbered sequentially from 1 to 20 in the order of transmission) may be sent to a destination port via several switch planes. If, for example, cells 11-20 arrive before cell 10 arrives, then cells 11-20 are stored in a buffer and sent out after cell 10 is received. However, if the buffer size is limited to less than ten cells, the buffer would overflow.

Although increasing the buffer size helps to ameliorate the buffer overflow problem, the number of cells to be reordered may still exceed the amount of buffer space available, thus the problem is not completely eliminated. Furthermore, since it is preferable to use on-chip memory to implement the reorder buffers, increasing the reorder buffer size would increase the cost of the switch fabric components significantly. It would be desirable if the reorder buffer depth could be bounded to a limited size. It would also be useful if the buffer used for reordering purposes could be kept small enough so that on-chip memory could be used in a cost effective way.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

1. A technique for limiting cell reorder buffer depth is disclosed. As used herein, cell reorder buffer depth refers to the number of cells stored in the reorder buffer at any point in time. It is necessary to limit this depth, e.g., by sending source-based backpressure, to prevent the overflow of the buffer and the associated loss of data. In some embodiments, an incoming cell received out of sequence is classified and stored in a reorder buffer. If the reorder buffer exceeds a depth limit, backpressure information is sent to a source associated with the reorder buffer. The source may be a particular source port and/or a particular switch plane (e.g., a source port/switch plane pair). In some embodiments, when the depth of a cell reorder buffer reaches a prescribed threshold, backpressure is sent to the affected sources via the applicable switch plane, in the form of a header value in a cell destined for the switch plane associated with the buffer, using a field that normally is used by the switch fabric to send congestion information indicating link failure or congestion conditions to ports associated with the switch fabric.

Figure 1:
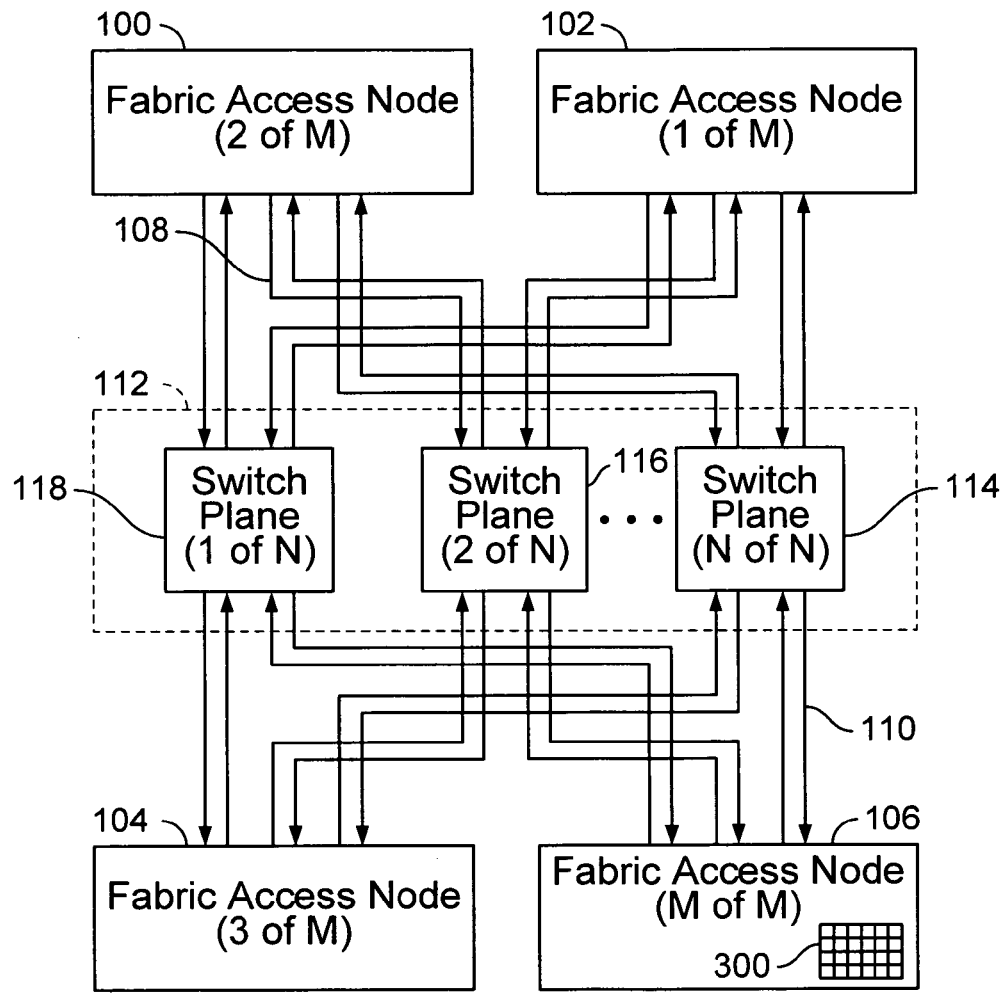
FIG. 1 is a block diagram illustrating a switch system embodiment.

FIG. 1 is a block diagram illustrating a switch system embodiment. In this example, a number "M" of fabric access nodes, represented in FIG. 1 by fabric access nodes 100-106, are coupled to a switch fabric 112. Switch fabric 112 includes a plurality of "N" switch planes, represented in FIG. 1 by switch planes 114-118. For the purposes of example, in the following discussion, data is divided into cells and then switched. Other units of measurements for data being transferred, such as packets, frames, cell segments, etc. may also be used. The lengths of the units may be fixed or variable.

Each of the switch planes can switch cells independently, without requiring synchronization with other switch planes. Each switch plane may be a separate physical device, although in some embodiments one physical device, e.g., one integrated circuit, may support multiple switch planes. Each fabric access node is associated with one or more ports that are connected to the switch plane via bi-directional connections such as 108 and 110. As used herein, a port refers to a logical source or destination that can be addressed for the purposes of transferring data. Data is transferred from an input (source) port to an output (destination) port via the bidirectional connections. A link such as link 108 used to transfer data from an input (source) port to the switch fabric is referred to as an ingress link, and a link such as link 110 used to transfer data from the switch fabric to an output (destination) port is referred to as an egress link. In the example shown, a port is serviced by one or more ingress-egress link pairs. A port may function both as an input port with respect to the ingress link and an output port with respect to the egress link. In this example each fabric access node includes a buffer (such as buffer 300 of fabric access node 106) that is used to temporarily store cells that arrive out of sequence until the cells may be placed in the proper order and sent via an egress link (e.g., a system interface) to their destination. The cell reorder buffer is preferably implemented using on-chip memory. Details of the buffer are discussed below.

Figure 2:
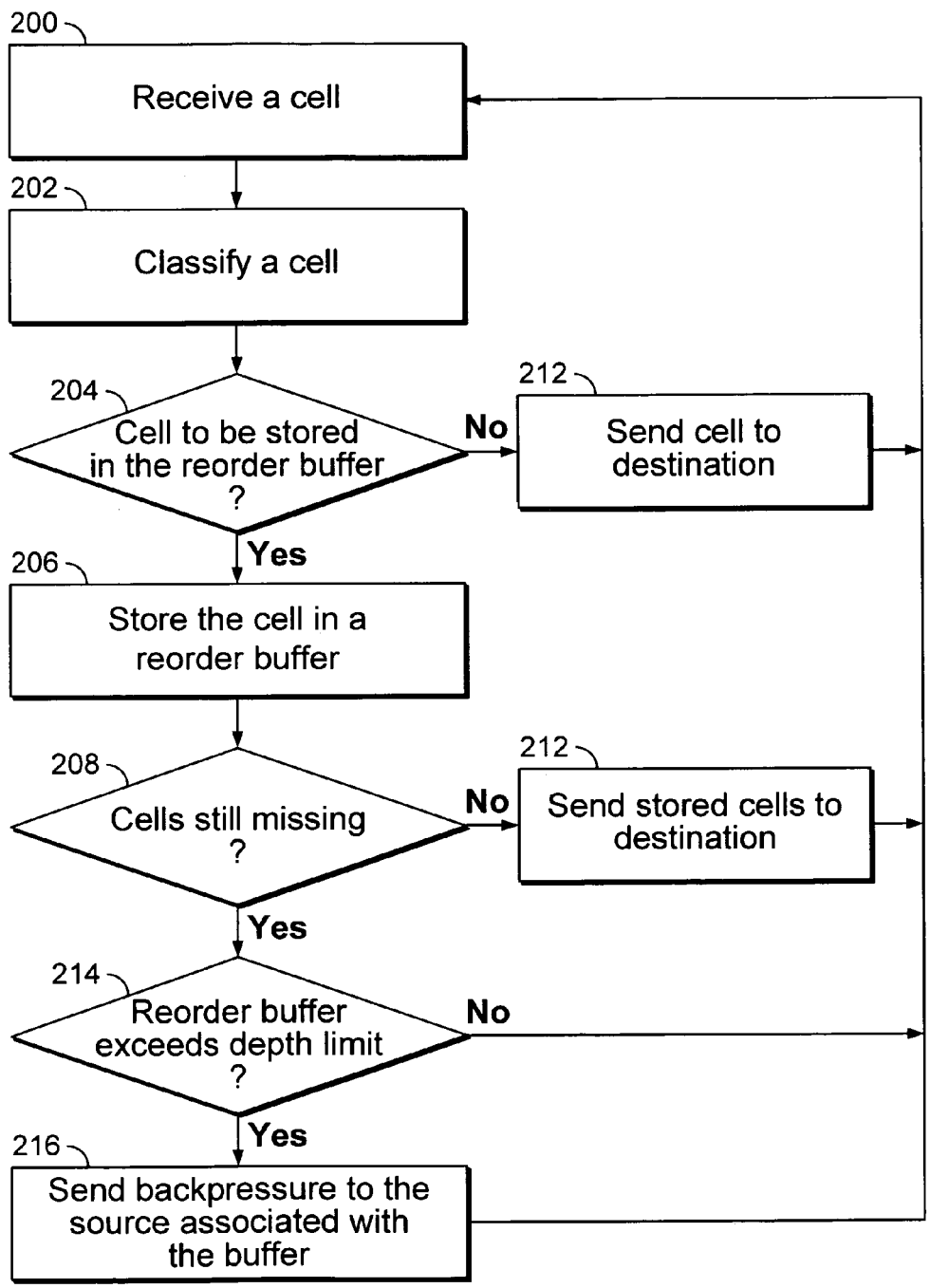
FIG. 2 is a flow chart illustrating a process of bounding cell reorder depth according to some embodiments.

FIG. 2 is a flow chart illustrating a process of bounding cell reorder depth according to some embodiments. In this example, when a cell is received (200), it is classified (202). There are several ways to classify the cell and the classification may vary for different embodiments. For example, an incoming cell may be classified based on the source of the cell (e.g., the logical source port), the switch plane via which the cell is transferred, and the priority level (or other class) of the cell. It is then determined whether the cell is to be stored in a reorder buffer (204). In this example, an incoming cell is to be stored in a reorder buffer if any cell transmitted before it has not yet been received, or if the incoming cell itself is missing from the sequence of cells currently stored in the buffer. If it is determined that the cell does not need to be stored in the reorder buffer, the cell is sent to its destination (212). Otherwise, the cell is added to the reorder buffer (206). It is then determined whether the sequence of cells in the reorder buffer still has missing cells (208). If, after the addition of the incoming cell, the sequence of the cells in the buffer no longer has any missing cells, the stored cells are reordered and sent to the destination (212). If, however, the sequence of cells in the buffer still has missing cells, it is then determined whether the reorder buffer exceeds the predetermined depth limit (214). In some embodiments, the fabric access node monitors its reorder buffer and determines whether the number of cells stored in the buffer or any subdivision thereof exceeds the predetermined depth limit or threshold. In some embodiments, a processor or logic circuit is used to monitor the reorder buffer. If the depth limit is exceeded, it indicates that cells have been received out of sequence and one or more cells from one or more sequences are missing or have been delayed in arriving such that the reorder buffer is starting to fill as previously received cells are held in the buffer and subsequently received cells are added, such that there is a net inflow to the reorder buffer or one or more subdivisions thereof. This may be caused by link failure or congestion along the transmission path of the cells. Backpressure is then sent to a source associated with the cell reorder buffer or subdivision thereof that has hit or exceeded the threshold depth (216), signaling to the source that data transmission of cells associated with the buffer (or subdivision) should be reduced or suspended. For example, if the cell reorder buffer is organized by source port/class, and within each source port/class region by switch plane, backpressure information may be sent to tell the source port to stop sending traffic of the affected class to that destination via the switch plane associated with the buffer that is getting too full. In some embodiments, the threshold is selected to ensure that such backpressure information can be received and acted on before overflow occurs. If, however, the reorder buffer depth threshold has not been exceeded, no backpressure needs to be sent and the process waits to receive and classify the next cell (200) and the process is repeated.

Figure 3:
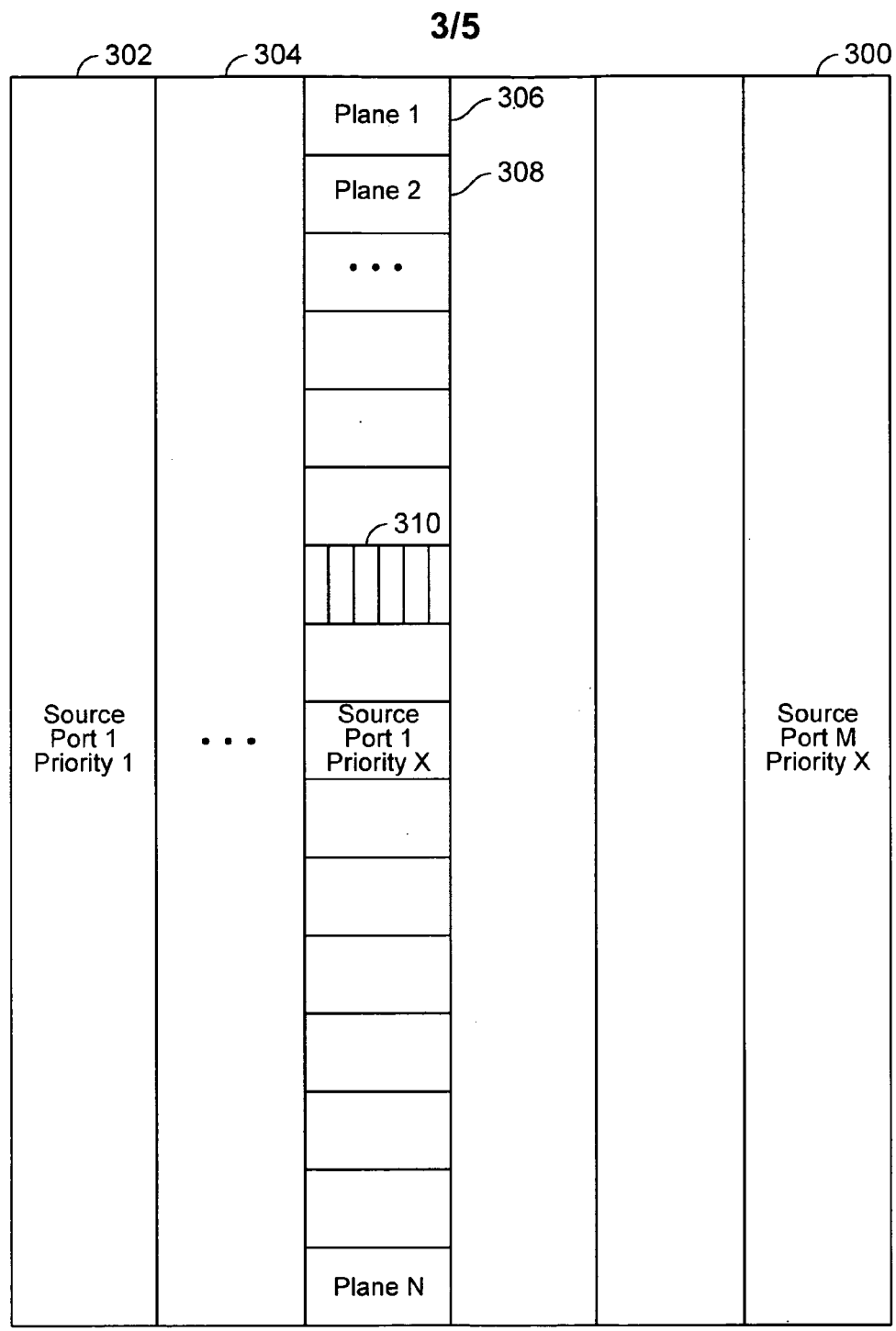
FIG. 3 is a diagram illustrating the organization of a cell reorder buffer, according to some embodiments.

FIG. 3 is a diagram illustrating the organization of a cell reorder buffer, according to some embodiments. In this example, cell reorder buffer 300 is implemented as on-chip memory that is a part of a fabric access node associated with a switch system similar to the example shown in FIG. 1. The switch system includes M logical ports, where each port supports X priority levels of traffic. The switch fabric of the system includes N switch planes. Accordingly, the buffer is organized into regions based on source port and traffic priority, such as regions 302 and 304. Within each port-priority region, the memory is further divided into sub-regions based on switch planes. Thus, each sub-region can be used to store a class of cells from a specific source, traffic priority and switch plane. Examples of such sub-regions include 306 and 308. In this example, the sub-regions function as reorder buffers in which cells that arrive out of sequence may be stored until the cells necessary to reorder the cells and provide them as output arrive. Each sub-region includes enough storage space to store up to six cells. The depth limit (threshold) for a class of cells is set to three, which means that backpressure is asserted for a class of cells if there are more than 3 cells stored in the reorder buffer corresponding to the class of cells. The classification of the cells, the size of the sub-region as well as the depth limit may vary for different embodiments.

In some embodiments, if an egress link used to transfer a cell to its destination is congested or otherwise experiencing failure, the congestion information (also referred to as destination based backpressure information) is sent by the switch fabric to the source ports to route future packets around the failed link. For example, U.S. patent application Ser. No. 10/831,629, filed concurrently herewith and incorporated herein by reference for all purposes, describes a technique for sending destination based back pressure information from the switch fabric to the appropriate data sources. Cells may include a reserved field for communicating the backpressure information. In some embodiments, when congestion is detected, the switch fabric uses the reserved field in cells sent subsequently to the various other source ports to advise the ports not to send to the affected destination via the affected switch plane. In some embodiments, the reserved field comprises a backpressure map in which data fields are set to prescribed values to indicate whether backpressure is present with respect to a particular destination. Fabric access devices associated with the ports receiving cells from the switch fabric use this backpressure information to determine which link(s) may be used to send cells to particular destinations via the switch fabric. Normally, the ports make no use of the backpressure field(s) when they send cells into the switch fabric, even where the field(s) is/are present, e.g., where the same cell format is used to send cells into the switch fabric as is used by the switch fabric to send cells to the ports. In some embodiments, the backpressure field(s) is/are used by the ports (e.g., by the fabric access device associated with the port) to send to the switch fabric source based backpressure, as described above, to bound cell reorder depth as described herein (see, e.g., step 216 of FIG. 2). For example, in the case of a cell reorder buffer organized as shown in FIG. 3, in the event a buffer region such as 306 or 308 exceeded the reorder depth limit or threshold, back pressure would be sent to the associated source port telling it not to send (for now) via the switch plane associated with the region any more traffic of the priority associated with the region. To give a specific example, if the cell reorder buffer region 306 of FIG. 3 exceeded the threshold, backpressure information would be sent telling source port 1 to temporarily stop sending priority X traffic to that destination via switch plane 1, because the buffer that is getting full (306) is associated with source port 1, priority X, and switch plane 1 in this example. This information would be sent into the switch fabric by "reusing" in the sense that the backpressure field bits that otherwise would go unused by the port in cells it sends into the switch fabric. In some embodiments, the switch fabric responds to this information by discontinuing delivery of cells from that source/priority to the affected destination via the affected switch plane. In such an embodiment, the normally destination based backpressure mechanisms of the switch fabric would be invoked, if necessary, to get the source port to stop sending such cells into the switch fabric.

Figure 4:
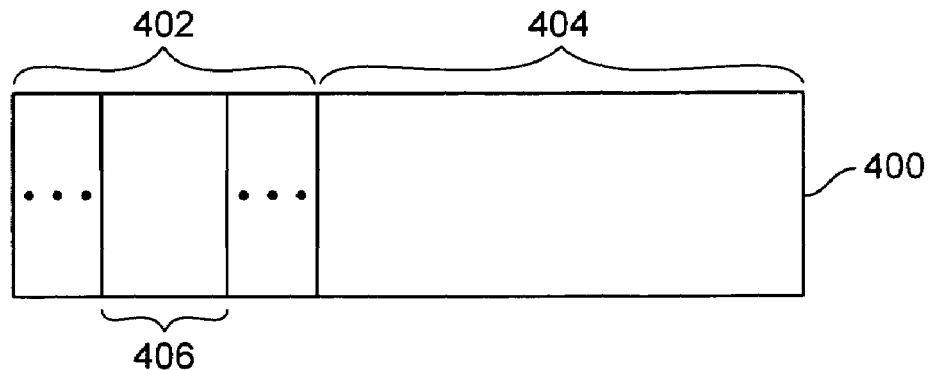
FIG. 4 is a diagram illustrating the structure of a cell according to some embodiments.

FIG. 4 is a diagram illustrating the structure of a cell according to some embodiments. In this example, cell 400 includes a header region 402 and a payload region 404. Within the header region, a reserved field 406 is used for sending congestion or backpressure information. Returning to the example system shown in FIG. 1, if an egress link such as 110 becomes unavailable because of congestion or failure, a switch plane associated with the failed link (such as switch plane 114) will insert information in the reserved field of subsequent cells destined for other ports to signal the link failure, so that the other ports can stop sending data to the failed link.

The reserved field can be reused to control the reorder depth, as described above. In some embodiments, the backpressure status of different classes of traffic is mapped to the bits in the reserved field. For example, the backpressure status map for a system that includes 32 ports and 2 priority levels includes 64 bits. If, for example, fabric access node 106 detects that the reorder buffer associated with source port 1, priority level 2 and switch plane 5 has exceed the depth limit, then in the reserved field of the next cell destined for source port 1, the fabric access node will set an appropriate bit that corresponds to the source port and priority level, so that source port 1 will stop sending cells of priority level 1 via switch plane 5 (or, in some embodiments, the switch fabric will stop delivering such cells via the affected switch plane). The cell used to communicate the backpressure information may be a data cell, an idle cell sent in the absence of a data cell, or a cell generated specifically for the purpose of communicating the backpressure. When the one or more missing cells are eventually received and the reorder buffer is allowed to clear, backpressure information is reset in subsequent cells so that the source port may restart sending data again.

Figure 5:
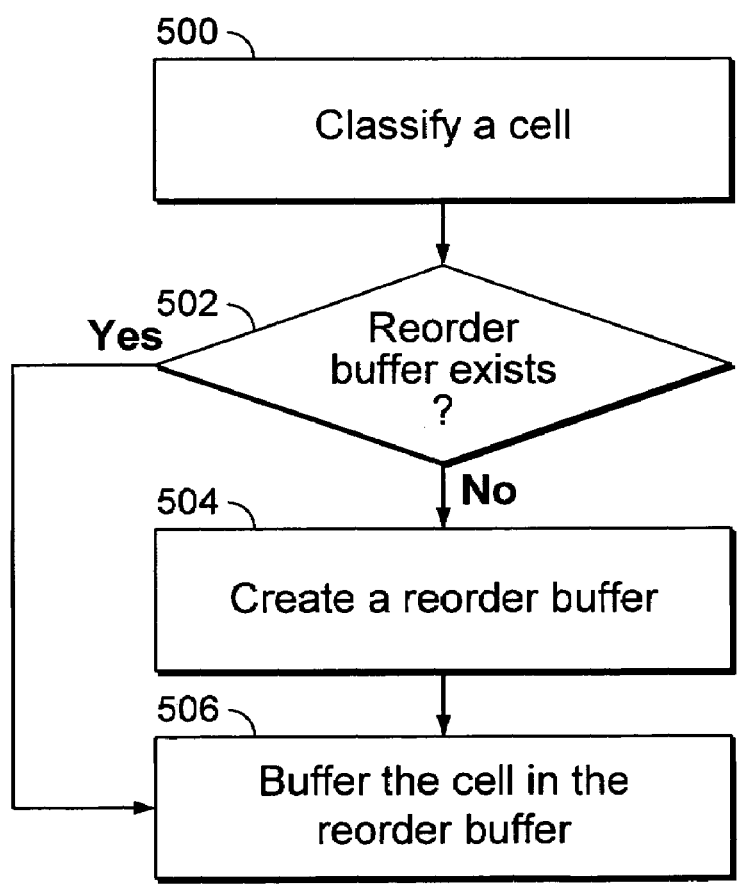
FIG. 5 is a flow chart illustrating a dynamic memory allocation process according to some embodiments.

In some embodiments, rather than statically allocating memory as shown in FIG. 3, the cell reorder buffer is allocated on demand to allow more efficient memory usage. FIG. 5 is a flow chart illustrating a dynamic memory allocation process according to some embodiments. In this example, once a cell is classified to be stored in the reorder buffer (500), it is determined whether a reorder buffer exists for the cell source and priority level (502). If the reorder buffer does not exist, it is created (504). If the reorder buffer exists, or if a new reorder buffer has been created, the cell is then stored in the reorder buffer (506).

Figure 6:
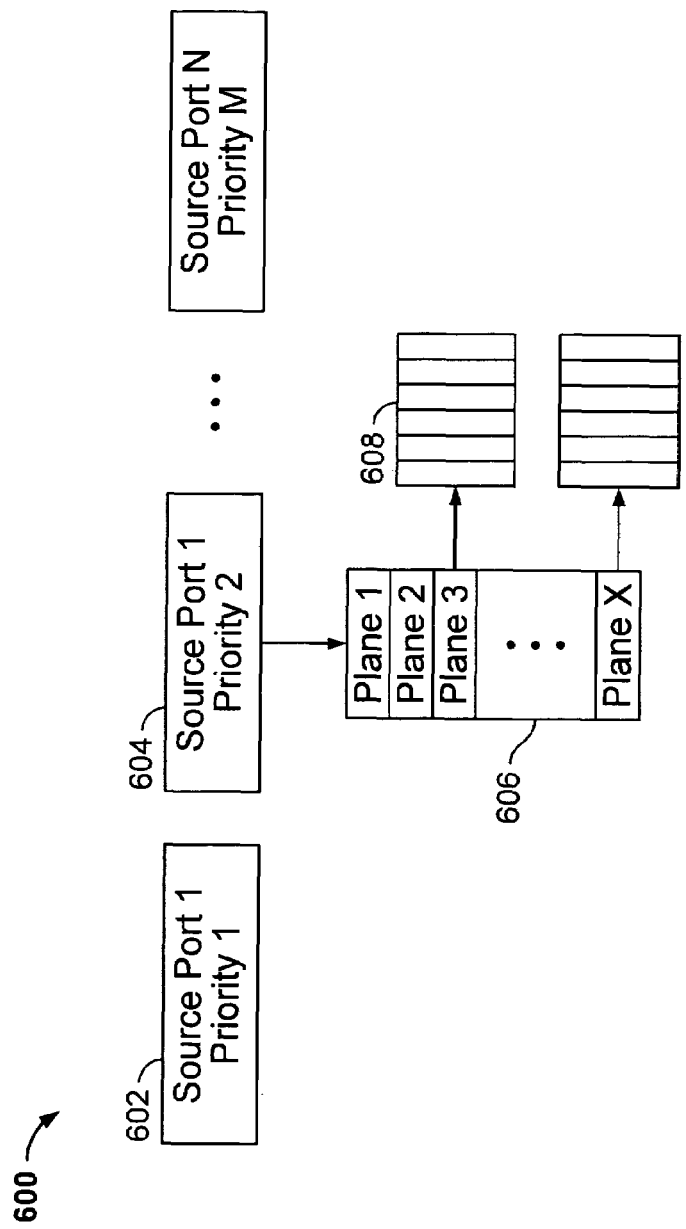
FIG. 6 is a diagram illustrating the structure of a dynamic memory buffer according to some embodiment.

FIG. 6 is a diagram illustrating the structure of a dynamic memory buffer according to some embodiment. In this example, memory 600 is initialized with structures that correspond to the source port/priority level classes. Each source port-priority level combination is associated with an address pointer such as 602 or 604. When a reorder buffer is to be created, a memory structure 606 is allocated for storing address pointers associated with switch planes 1-X, which each corresponds to a reorder buffer such as 608. The reorder buffers may be created at the same time as the plane structure or at a later time as needed. When the cell missing from the sequence arrives and the sequence of cells stored in the reorder buffer is sent to the appropriate destination, the memory allocated for the reorder buffer may be freed. Other memory organization may also be applicable.

Dynamic allocation may make it possible to permit greater cell reorder buffer depth within the limits of the available memory and provides greater scalability. The approach described herein may be used to bound cell reorder depth in an embodiment in which cell reorder buffers are allocated dynamically, and it may be desirable or necessary to do so, even where dynamic allocation is used, to prevent any buffer or subset of buffers from consuming too much of the available memory resources.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of bounding cell reorder buffer depth, comprising:
   determining whether a reorder buffer that is associated with a switch fabric exceeds a depth limit, wherein:
      the depth limit is than the size of the reorder buffer; and
      the reorder buffer is one of a plurality of reorder buffers, each of the plurality of reorder buffers being configured to store one or more cells of a respective class having a respective priority level and being received from a respective source port via a respective switch plane; and
   in the event that the reorder buffer exceeds the depth limit, sending backpressure with respect to the respective source port associated with the reorder buffer by including in a subsequent cell being sent into the switch fabric source based backpressure information that pertains to the respective source port, the source based backpressure information being configured to temporarily stop the respective source port from sending traffic with the respective priority associated with the reorder buffer via the respective switch plane associated with the reorder buffer, wherein:
      the source based back pressure information is stored in a multi-purpose reserved field in the subsequent cell; and
      the multi-purpose reserved field is re-used, in the event that an egress link is unavailable, to include destination based backpressure information configured to signal that the egress link is unavailable and to stop other ports from sending data to the unavailable egress link.

2. A method of bounding cell reorder buffer depth as in claim 1 wherein the reserved field is further included in any cell sent by the switch fabric to a port, and the reserved field comprises a map of backpressure status information for a plurality of ports associated with the switch fabric.

3. A method of bounding cell reorder buffer depth as in claim 1 wherein said source based backpressure information comprises information indicating that the switch fabric should stop sending to a destination port with which the reorder buffer is associated cells from said respective source port.

4. A method of bounding cell reorder buffer depth as in claim 1 wherein said source based backpressure information comprises information indicating that said source port should stop sending cells to a destination port with which the reorder buffer is associated.

5. A method of bounding cell reorder buffer depth as in claim 1 wherein said source based backpressure information comprises information indicating that said source associated with the reorder buffer should stop sending to a destination port with which the reorder buffer is associated cells of said respective priority level.

6. A method of bounding cell reorder buffer depth as in claim 1 wherein said source based backpressure information comprises information indicating that said source associated with the reorder buffer should stop sending cells to a destination port with which the reorder buffer is associated via said respective switch plane.

7. A method of bounding cell reorder buffer depth as in claim 1 wherein the reorder buffer is allocated statically.

8. A method of bounding cell reorder buffer depth as in claim 1 wherein the reorder buffer is allocated dynamically.

9. A fabric access device comprising:
a plurality of reorder buffers, each of the plurality of reorder buffers being configured to store one or more cells of a respective class having a respective priority level and being received from a respective source port via a respective switch plane;
processor configure to:
determine whether one of the plurality of reorder buffers that is associated with a switch fabric exceeds a depth limit, the depth limit being less than the size of the reorder buffer; and
in the event that the reorder buffer exceeds the depth limit, send backpressure with respect to the respective source port associated with the reorder buffer by including in a subsequent cell being sent into the switch fabric source based backpressure information that pertains to the respective source port, the source based backpressure information being configured to temporarily stop the respective source port from sending traffic with the respective priority associated with the reorder buffer via the respective switch plane associated with the reorder buffer, wherein:
the source based back pressure information is stored in a multi-purpose reserved field in the subsequent cell; and
the multi-purpose reserved field is re-used, in the event that an egress link is unavailable, to include destination based backpressure information configured to signal that the egress link is unavailable and to stop other ports from sending data to the unavailable egress link.

10. A computer program product for bounding cell reorder buffer depth, the computer program product being embodied in a computer readable storage medium and comprising computer instructions for:
determining whether a reorder buffer that is associated with a switch fabric exceeds a depth limit, wherein:
the depth limit being less than the size of the reorder buffer; and
the reorder buffer is one of a plurality of reorder buffers, each of the plurality of reorder buffers being configured to store one or more cells of a respective class having a respective priority level and being received from a respective source port via a respective switch plane; and
in the event that the reorder buffer exceeds the depth limit, sending backpressure with respect to the respective source port associated with the reorder buffer by including in a subsequent cell being sent into the switch fabric source based backpressure information that pertains to the respective source port, the source based backpressure information being configured to temporarily stop the respective source port from sending traffic with the respective priority associated with the reorder buffer via the respective switch plane associated with the reorder buffer, wherein:
the source based back pressure information is stored in a multi-purpose reserved field in the subsequent cell; and
the multi-purpose reserved field is re-used, in the event that an egress link is unavailable, to include destination based backpressure information configured to signal that the egress link is unavailable and to stop other ports from sending data to the unavailable egress link.

11. A fabric access device as recited in claim 9, wherein the reserved field is further included in any cell sent by the switch fabric to a port, and the reserved field comprises a map of backpressure status information for a plurality of ports associated with the switch fabric.

12. A fabric access device as recited in claim 9, wherein said source based backpressure information comprises information indicating that the switch fabric should stop sending to a destination port with which the reorder buffer is associated cells from said respective source port.

13. A fabric access device as recited in claim 9, wherein said source based backpressure information comprises information indicating that said source port should stop sending cells to a destination port with which the reorder buffer is associated.

14. A fabric access device as recited in claim 9, wherein said source based backpressure information comprises information indicating that said source associated with the reorder buffer should stop sending to a destination port with which the reorder buffer is associated cells of said respective priority level.

15. A fabric access device as recited in claim 9, wherein said source based backpressure information comprises information indicating that said source associated with the reorder buffer should stop sending cells to a destination port with which the reorder buffer is associated via said respective switch plane.

16. A fabric access device as recited in claim 9, wherein the reorder buffer is allocated statically.

17. A fabric access device as recited in claim 9, wherein the reorder buffer is allocated dynamically.

* * * * *

UNITED STATES PATENT AND TRADEMARK OFFICE
CERTIFICATE OF CORRECTION

PATENT NO. : 7,633,861 B2  Page 1 of 1
APPLICATION NO. : 10/831699
DATED : December 15, 2009
INVENTOR(S) : Willhite et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Twenty-first Day of December, 2010

David J. Kappos
*Director of the United States Patent and Trademark Office*